(12) United States Patent
Wang et al.

(10) Patent No.: US 10,798,568 B2
(45) Date of Patent: Oct. 6, 2020

(54) METHOD, SYSTEM AND INTELLIGENT TERMINAL FOR PAIRING BETWEEN INTELLIGENT WEARABLE DEVICE AND INTELLIGENT TERMINAL

(71) Applicant: Alibaba Group Holding Limited, George Town (KY)

(72) Inventors: Xiaochen Wang, Hangzhou (CN); Mian Huang, Hangzhou (CN); Yuanbo Sun, Hangzhou (CN); Fei Meng, Hangzhou (CN); Xiaofeng Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/192,329

(22) Filed: Nov. 15, 2018

(65) Prior Publication Data

US 2019/0104406 A1 Apr. 4, 2019

Related U.S. Application Data

(63) Continuation of application No. PCT/CN2017/080189, filed on Apr. 12, 2017.

(30) Foreign Application Priority Data

May 16, 2016 (CN) .......................... 2016 1 0322257

(51) Int. Cl.
*H04W 12/00* (2009.01)
*H04W 12/08* (2009.01)
(Continued)

(52) U.S. Cl.
CPC ........ *H04W 12/002* (2019.01); *G06K 7/1413* (2013.01); *G06K 7/1417* (2013.01);
(Continued)

(58) Field of Classification Search
USPC ............ 726/7, 2, 21, 36; 713/150, 163, 181; 380/255, 264, 276
See application file for complete search history.

(56) References Cited

U.S. PATENT DOCUMENTS

| | | | | |
|---|---|---|---|---|
| 2008/0285626 A1* | 11/2008 | Claus | ............... | H04W 12/06 375/133 |
| 2015/0264543 A1* | 9/2015 | Lin | .................. | H04L 67/26 370/329 |

FOREIGN PATENT DOCUMENTS

| | | |
|---|---|---|
| CN | 103701503 | 4/2014 |
| CN | 104200176 | 12/2014 |

(Continued)

OTHER PUBLICATIONS

European Extended Search Report in European Application No. 17798573.6, dated Mar. 22, 2019, 7 pages.
(Continued)

*Primary Examiner* — Sharif E Ullah
(74) *Attorney, Agent, or Firm* — Fish & Richardson P.C.

(57) ABSTRACT

An intelligent terminal scans, as a scanned identification code, an identification code that is displayed by an intelligent wearable device. A wireless broadcast signal is transmitted by the intelligent terminal to identify the intelligent wearable device. A response to the wireless broadcast signal is received by the intelligent terminal and from the intelligent wearable device, where the response includes an identification code. The identification code is extracted by the intelligent terminal from the response and as an extracted identification code. The intelligent terminal compares the scanned identification code and the extracted identification code. If it is determined that the scanned identification code and the extracted identification code are the same, the intelligent terminal is paired with the intelligent wearable device.

6 Claims, 5 Drawing Sheets

(51) Int. Cl.
*H04W 12/06* (2009.01)
*G06K 7/14* (2006.01)
*G06K 19/06* (2006.01)

(52) U.S. Cl.
CPC . *G06K 19/06028* (2013.01); *G06K 19/06037* (2013.01); *H04W 12/003* (2019.01); *H04W 12/06* (2013.01); *H04W 12/08* (2013.01); *H04W 12/00522* (2019.01)

(56) References Cited

FOREIGN PATENT DOCUMENTS

| | | |
|---|---|---|
| CN | 104378145 | 2/2015 |
| CN | 204203650 | 3/2015 |
| CN | 104540190 | 4/2015 |
| CN | 104715365 | 6/2015 |
| CN | 104735607 | 6/2015 |
| CN | 105142095 | 12/2015 |
| CN | 105376696 | 3/2016 |
| EP | 2813921 | 12/2014 |

OTHER PUBLICATIONS

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

International Search Report by the International Searching Authority issued in International Application No. PCT/CN2017/080189 dated Jul. 10, 2017; 8 pages.

\* cited by examiner

METHOD, SYSTEM AND INTELLIGENT TERMINAL FOR PAIRING BETWEEN INTELLIGENT WEARABLE DEVICE AND INTELLIGENT TERMINAL

CROSS-REFERENCE TO RELATED APPLICATIONS

This application is a continuation of PCT Application No. PCT/CN2017/080189, filed on Apr. 12, 2017, which claims priority to Chinese Patent Application No. 201610322257.8, filed on May 16, 2016, and each application is hereby incorporated by reference in its entirety.

TECHNICAL FIELD

The present application relates to the field of intelligent wearable device technologies, and in particular, to a method, a system and an intelligent terminal for pairing between an intelligent wearable device and an intelligent terminal.

BACKGROUND

An intelligent wearable device generally needs to be connected to an intelligent terminal. To establish a connection, pairing needs to be first completed. In particular, as various applications can be installed on the intelligent terminal today, to implement corresponding functions of the applications, the applications generally invoke a wireless module of the intelligent terminal to complete a connection to the intelligent wearable device.

In the existing technology, in an example of a smart wristband, an application on a smartphone can be paired with the smart wristband by using Bluetooth. Specifically, the smartphone (as a master device) usually sends a Bluetooth broadcast signal, and a smart wristband (as a slave device) receiving the broadcast signal sends a response to the smartphone, so the smartphone and the smart wristband that sends the response are paired and establish a connection.

Currently, applications have an increasingly high demand for security connection, especially the applications related to personal information and payment on the intelligent terminal, and the function needs to be implemented in a relatively secure environment. Based on previous description, in the existing technology, there is probably more than one smart wristband that can respond to the smartphone. If the smart wristbands that need to connect to the smartphone are not screened, a security risk can be caused.

SUMMARY

An objective of implementations of the present application is to provide a method, a system and an intelligent terminal for pairing between an intelligent wearable device and an intelligent terminal, to implement secure pairing between the intelligent terminal and the intelligent wearable device.

To resolve the previous technical problem, the implementations of the present application are implemented as follows.

A method for pairing between an intelligent wearable device and an intelligent terminal is provided, including: displaying, by the intelligent wearable device, an identification code; scanning, by the intelligent terminal, the identification code displayed by the intelligent wearable device; sending, by the intelligent terminal, a wireless broadcast signal, and monitoring a response sent to the intelligent terminal; returning, by the intelligent wearable device, the response after the intelligent wearable device receives the wireless broadcast signal sent by the intelligent terminal, where the response includes the identification code; receiving, by the intelligent terminal, the response, and extracting the identification code from the received response; and comparing, by the intelligent terminal, the extracted identification code and the scanned identification code, and pairing up with the intelligent wearable device if the extracted identification code and the scanned identification code are consistent.

A method for pairing between an intelligent wearable device and an intelligent terminal is provided, where at least one set of keys is pre-stored in the intelligent wearable device and an application installed on the intelligent terminal. Each set of keys has a corresponding index, and the method includes: displaying, by the intelligent wearable device, an identification code, and displaying a key index; scanning, by the intelligent terminal, the identification code and the key index that are displayed by the intelligent wearable device; sending, by the intelligent terminal, a wireless broadcast signal, and monitoring a response sent to the intelligent terminal; returning, by the intelligent wearable device, the response after the intelligent wearable device receives the wireless broadcast signal sent by the intelligent terminal, where the response includes the identification code; receiving, by the intelligent terminal, the response and extracting the identification code from the received response; comparing, by the intelligent terminal, the extracted identification code and the scanned identification code, and pairing up with the intelligent wearable device if the extracted identification code and the scanned identification code are consistent; and performing, by the intelligent terminal, encrypted communication with the intelligent wearable device by using a key corresponding to the key index.

A method for pairing between an intelligent wearable device and an intelligent terminal is provided, including: scanning, by the intelligent terminal, an identification code displayed by the intelligent wearable device; sending, by the intelligent terminal, a wireless broadcast signal, and monitoring a response sent by the intelligent wearable device; receiving, by the intelligent terminal, the response, and extracting the identification code from the received response; and comparing, by the intelligent terminal, the extracted identification code and the scanned identification code, and pairing up with the intelligent wearable device if the extracted identification code and the scanned identification code are consistent.

A method for pairing between an intelligent wearable device and an intelligent terminal is provided, including: scanning, by the intelligent terminal, an identification code and a key index that are displayed by the intelligent wearable device; sending, by the intelligent terminal, a wireless broadcast signal, and monitoring a response sent by the intelligent wearable device; receiving, by the intelligent terminal, the response, and extracting the identification code from the received response; comparing, by the intelligent terminal, the extracted identification code and the scanned identification code, and pairing up with the intelligent wearable device if the extracted identification code and the scanned identification code are consistent; and performing, by the intelligent wearable device, encrypted communication with the intelligent terminal by using a key corresponding to the key index.

A system for pairing between an intelligent wearable device and an intelligent terminal is provided, including: the intelligent wearable device, configured to display an identification code, and return a response after the intelligent wearable device receives a wireless broadcast signal sent by the intelligent terminal, where the response includes the identification code; and the intelligent terminal, configured to scan the identification code displayed by the intelligent wearable device, send the wireless broadcast signal and monitor the response sent by the intelligent wearable device, receive the response and extract the identification code from the received response, compare the extracted identification code with the scanned identification code, and pair up with the intelligent wearable device if the extracted identification code and the scanned identification code are consistent.

A system for pairing between an intelligent wearable device and an intelligent terminal is provided. The intelligent wearable device, where at least one set of keys is pre-stored, each set of keys has a corresponding index, and the intelligent wearable device is configured to display an identification code and a key index, return a response after the intelligent wearable device receives a wireless broadcast signal sent by the intelligent terminal, where the response includes the identification code, and perform encrypted communication with the intelligent terminal by using a key corresponding to the key index. The intelligent terminal, where at least one set of keys that is the same as the set of keys of the intelligent wearable device is pre-stored, each set of keys has a corresponding index, and the intelligent terminal is further configured to scan the identification code and the key index that are displayed by the intelligent wearable device, send the wireless broadcast signal, and monitor a response sent to the intelligent terminal, receive the response, and extract the identification code from the received response, compare the extracted identification code with the scanned identification code, and pair up with the intelligent wearable device if the extracted identification code and the scanned identification code are consistent. Moreover, perform encrypted communication with the intelligent wearable device by using a key corresponding to the key index.

An intelligent terminal is provided, including: a scanning unit, configured to scan an identification code displayed by an intelligent wearable device; a broadcasting unit, configured to send a wireless broadcast signal; a monitoring unit, configured to monitor a response sent by the intelligent wearable device; an extraction unit, configured to extract the identification code from the received response after the monitoring unit receives the response; a comparison unit, configured to compare the extracted identification code with the scanned identification code; and a pairing unit, configured to pair up with the intelligent wearable device if a comparison result of the comparison unit is that the extracted identification code and the scanned identification code are consistent.

An intelligent terminal is provided, including: a scanning unit, configured to scan an identification code and a key index that are displayed by an intelligent wearable device; a broadcasting unit, configured to send a wireless broadcast signal; a monitoring unit, configured to monitor a response sent by the intelligent wearable device; an extraction unit, configured to extract the identification code from the received response after the monitoring unit receives the response; and a comparison unit, configured to compare the extracted identification code with the scanned identification code; a pairing unit, configured to pair up with the intelligent wearable device if a comparison result of the comparison unit is that the extracted identification code and the scanned identification code are consistent; and a communications unit, configured to perform encrypted communication with the intelligent wearable device by using a key corresponding to the key index.

It can be seen from the previous technical solution provided in the implementations of the present application that, the intelligent terminal can obtain the identification code of the intelligent wearable device through scanning, and can further extract the identification code of the intelligent wearable device from the received response. Further, the intelligent terminal can compare the two identification codes. If the two identification codes are consistent, it can be determined that the intelligent wearable device to be paired currently is the same as the scanned intelligent wearable device. That is, the intelligent wearable device to be paired currently is the intelligent wearable device to be connected, so that pairing can be completed. By using the previous implementations, the problem that the intelligent wearable device to be paired is not an intelligent wearable device that needs to be paired in fact can be alleviated, so that pairing security can be ensured.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings based on these accompanying drawings without creative efforts.

DESCRIPTION OF IMPLEMENTATIONS

Implementations of the present application provide a method, a system and an intelligent terminal for pairing between an intelligent wearable device and an intelligent terminal.

To make a person skilled in the art better understand the technical solutions in the present application, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
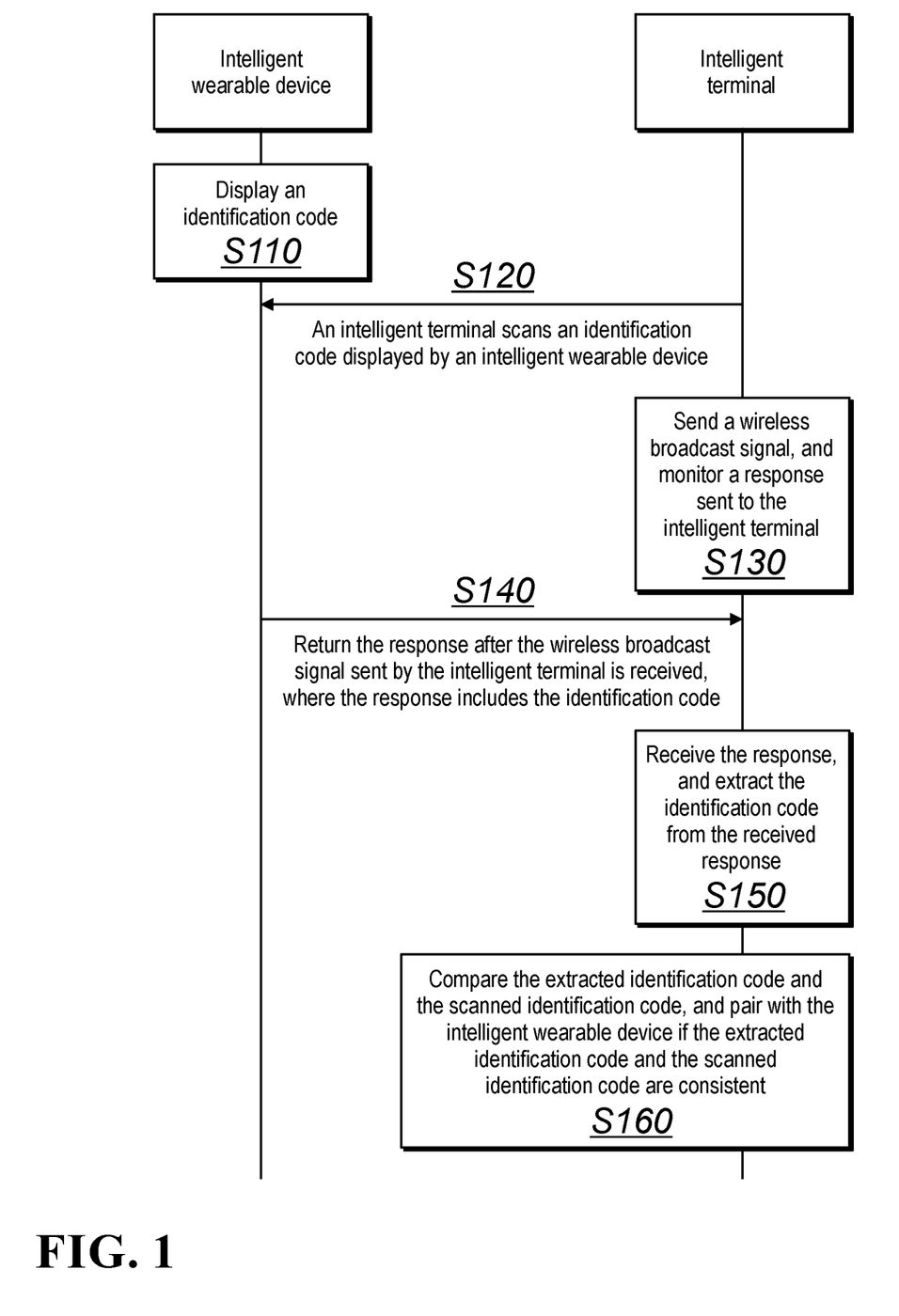
FIG. 1 is a flowchart illustrating an implementation of a method for pairing between an intelligent wearable device and an intelligent terminal, according to the present application.

The present disclosure provides an implementation of a method for pairing between an intelligent wearable device and an intelligent terminal. As shown in FIG. 1, the method includes the following steps.

S110: The intelligent wearable device displays an identification code.

The identification code can be used to identify the intelligent wearable device.

The intelligent wearable device can store the identification code and can display the stored identification code when pairing is started. In addition, the intelligent wearable device can alternatively dynamically generate the identification code and display the dynamically generated identification code when pairing is started.

The identification code can be a barcode, a two-dimensional code, etc.

S120: The intelligent terminal scans the identification code displayed by the intelligent wearable device.

An application implementing a specific function can be installed on the intelligent terminal. The application can implement the specific function by using a connected intelligent wearable device. To connecting to the intelligent wearable device to implement the specific function, the application generally needs to complete pairing with the intelligent wearable device to further establish a connection.

The intelligent terminal can have a camera. The application can invoke a camera module installed on the intelligent terminal, to scan the identification code.

S130: The intelligent terminal sends a wireless broadcast signal, and monitors a response sent to the intelligent terminal.

The intelligent terminal can send the wireless broadcast signal, to search for an intelligent wearable device to be paired.

S140: The intelligent wearable device returns the response after receiving the wireless broadcast signal sent by the intelligent terminal, where the response includes the identification code.

The identification code can be placed in a self-defined field of the response message. A location and a length of the self-defined field can be determined in advance through negotiation between the intelligent wearable device and an application installed on the intelligent terminal.

The Bluetooth technology is used as an example in S130 and S140. An implementation process is as follows: First, a master device (a device initiating pairing, for example, a mobile phone) sends a broadcast signal to page (page) a slave device (a device receiving the pairing, for example, a Bluetooth headset). Specifically, the master device can page the slave device using a frequency hopping method, and the slave device scans (scan) external paging at a fixed interval, which is referred to as page scan. When scanning the external paging, the slave device can return a response (response), to respond to the paging. As such, the two devices can further perform a pairing operation.

S150: The intelligent terminal receives the response, and extracts the identification code from the received response.

The intelligent terminal can receive the response, and can extract the identification code from the response based on a pre-negotiated location.

S160: The intelligent terminal compares the extracted identification code and the scanned identification code, and pairs up with the intelligent wearable device if the extracted identification code and the scanned identification code are consistent.

The intelligent terminal can obtain the identification code of the intelligent wearable device through scanning in S120, and can further extract the identification code of the intelligent wearable device from the received response in S150. Further, the intelligent terminal can compare the two identification codes. If the two identification codes are consistent, it can be determined that the intelligent wearable device to be paired currently is the same as the scanned intelligent wearable device, that is, the intelligent wearable device is the device to be connected, so that pairing can be completed. By using the previous implementation, the problem that the intelligent wearable device to be paired is not an intelligent wearable device that needs to be paired in fact can be alleviated, so that pairing security can be ensured.

The intelligent wearable device can connect to the intelligent terminal using a wireless connection method such as Bluetooth. The wireless connection method such as Bluetooth is weak in encryption, and data is easily monitored and intercepted. In the existing technology, a common practice is that no other encryption is performed on data except the Bluetooth encryption. The practice can be used in a scenario that does not require a very high security level, for example, motion data. Another practice is that an ECDH key agreement algorithm is used to negotiate a key encrypted transmission. As such an eSE chip needs to be embedded in the smart wristband, and costs are relatively high.

Figure 2:
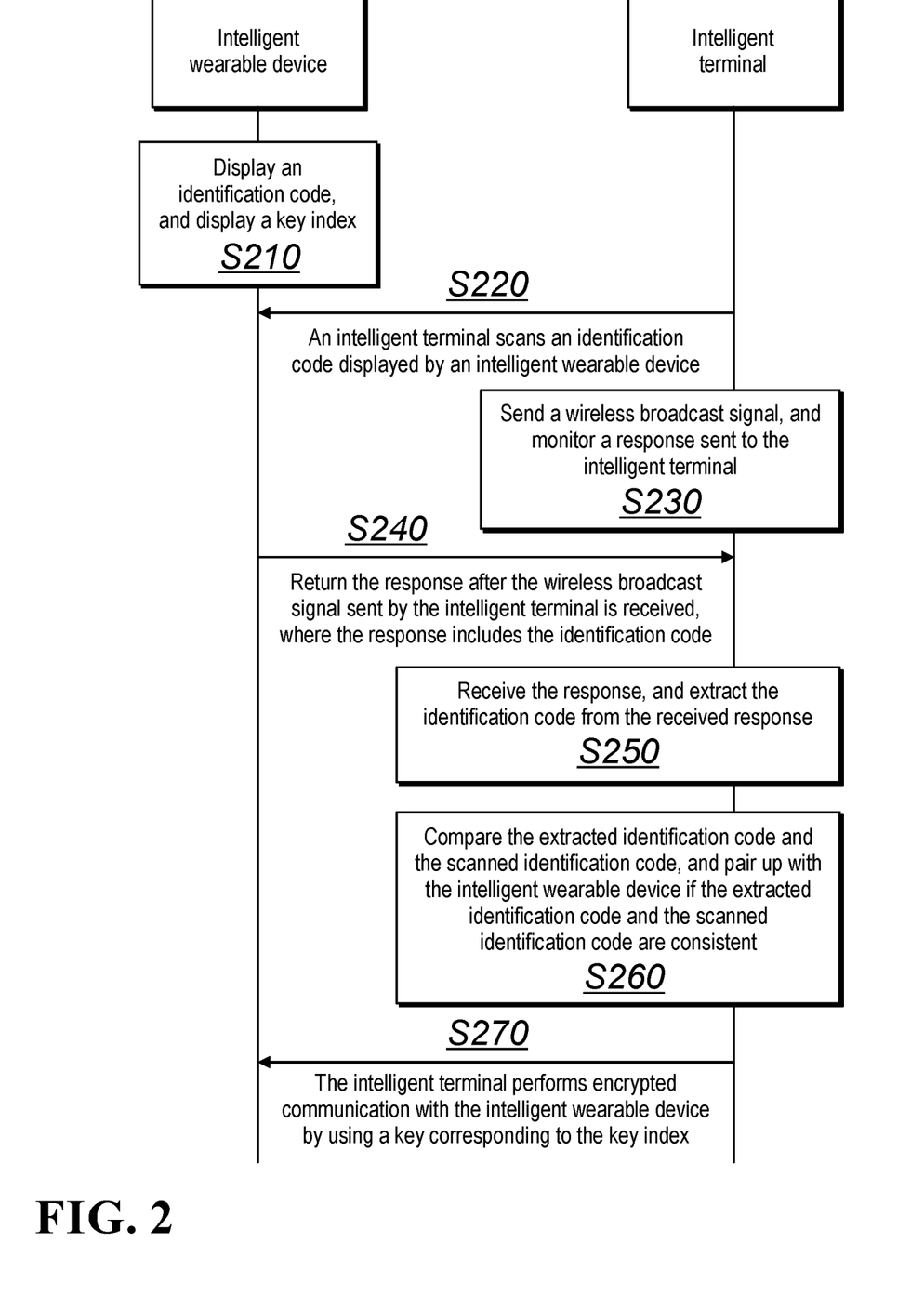
FIG. 2 is a flowchart illustrating an implementation of a method for pairing between an intelligent wearable device and an intelligent terminal, according to the present application.

In an implementation of the present application, a data transmission process can be further executed using an encryption method.

Specifically, for example, at least one set of keys is pre-stored in an intelligent wearable device and an application installed on an intelligent terminal, and each set of keys has a corresponding index. The following process is included.

S210: The intelligent wearable device displays an identification code, and displays a key index.

S220: The intelligent terminal scans the identification code and the key index that are displayed by the intelligent wearable device.

S230: The intelligent terminal sends a wireless broadcast signal, and monitors a response sent to the intelligent terminal.

S240: The intelligent wearable device returns the response after receiving the wireless broadcast signal sent by the intelligent terminal, where the response includes the identification code.

S250: The intelligent terminal receives the response, and extracts the identification code from the received response.

S260: The intelligent terminal compares the extracted identification code and the scanned identification code, and pair up with the intelligent wearable device if the extracted identification code and the scanned identification code are consistent.

S270: The intelligent terminal performs encrypted communication with the intelligent wearable device by using a key corresponding to the key index.

As such, data sent by the intelligent wearable device to the intelligent terminal can be encrypted by using the key corresponding to the key index, and then transmitted to the intelligent terminal. Because the intelligent terminal can scan the key index in S220, and the intelligent terminal stores at least one set of keys that is the same as the set of keys of the intelligent wearable device, after receiving the data transmitted by the intelligent wearable device, the intelligent terminal can decrypt the received data by using the key corresponding to the key index. Similarly, the data sent by the intelligent terminal to the intelligent wearable device can be encrypted by using the key corresponding to the key index. Therefore, after receiving the transmitted data, the intelligent wearable device can perform decryption by using the key corresponding to the key index. By using the previous process, the intelligent terminal performs encrypted communication with the intelligent wearable device by using the key corresponding to the key index. As such, security of the communication process can be improved.

The encrypted communication method can be a symmetrically encrypted communication method. Specifically, the encrypted communication can be performed by using a symmetric encryption algorithm such as a DES (Data Encryption Standard), an AES (Advanced Encryption Standard), an ECB (Electronic Codebook), or PKCS5Padding.

The present application further provides an implementation of a system for pairing between an intelligent wearable device and an intelligent terminal. The system includes: the intelligent wearable device, configured to display an identification code, return a response after the intelligent wearable device receives a wireless broadcast signal sent by the intelligent terminal, where the response includes the identification code; and the intelligent terminal, configured to scan the identification code displayed by the intelligent wearable device, send the wireless broadcast signal, and monitor the response sent by the intelligent wearable device, receive the response and extract the identification code from the received response; and compare the extracted identification code with the scanned identification code, and pair up with the intelligent wearable device if the extracted identification code and the scanned identification code are consistent.

Preferably, that the intelligent wearable device displays the identification code includes the intelligent wearable device displays a stored identification code; or the intelligent wearable device displays a dynamically generated identification code when pairing is started.

Preferably, the identification code includes a barcode and a two-dimensional code.

The present application further provides an implementation of a system for pairing between an intelligent wearable device and an intelligent terminal. The system includes: the intelligent wearable device, where at least one set of keys is pre-stored, each set of keys has a corresponding index, and the intelligent wearable device is configured to display an identification code and a key index, return a response after the intelligent wearable device receives a wireless broadcast signal sent by the intelligent terminal, where the response includes the identification code, and perform encrypted communication with the intelligent terminal by using a key corresponding to the key index; and the intelligent terminal, where at least one set of keys that is the same as the set of keys of the intelligent wearable device is pre-stored, each set of keys has a corresponding index, and the intelligent terminal is further configured to scan the identification code and the key index that are displayed by the intelligent wearable device, send the wireless broadcast signal and monitor a response sent to the intelligent terminal, receive the response and extract the identification code from the received response, compare the extracted identification code with the scanned identification code, pair up with the intelligent wearable device if the extracted identification code and the scanned identification code are consistent, and perform encrypted communication with the intelligent wearable device by using a key corresponding to the key index.

Preferably, that the intelligent wearable device displays the identification code includes the intelligent wearable device displays a stored identification code; or the intelligent wearable device displays a dynamically generated identification code when pairing is started.

Preferably, the identification code includes a barcode and a two-dimensional code.

Preferably, an encryption method includes at least one of a DES, an AES, an ECB, and PKCS5Padding.

Figure 3:
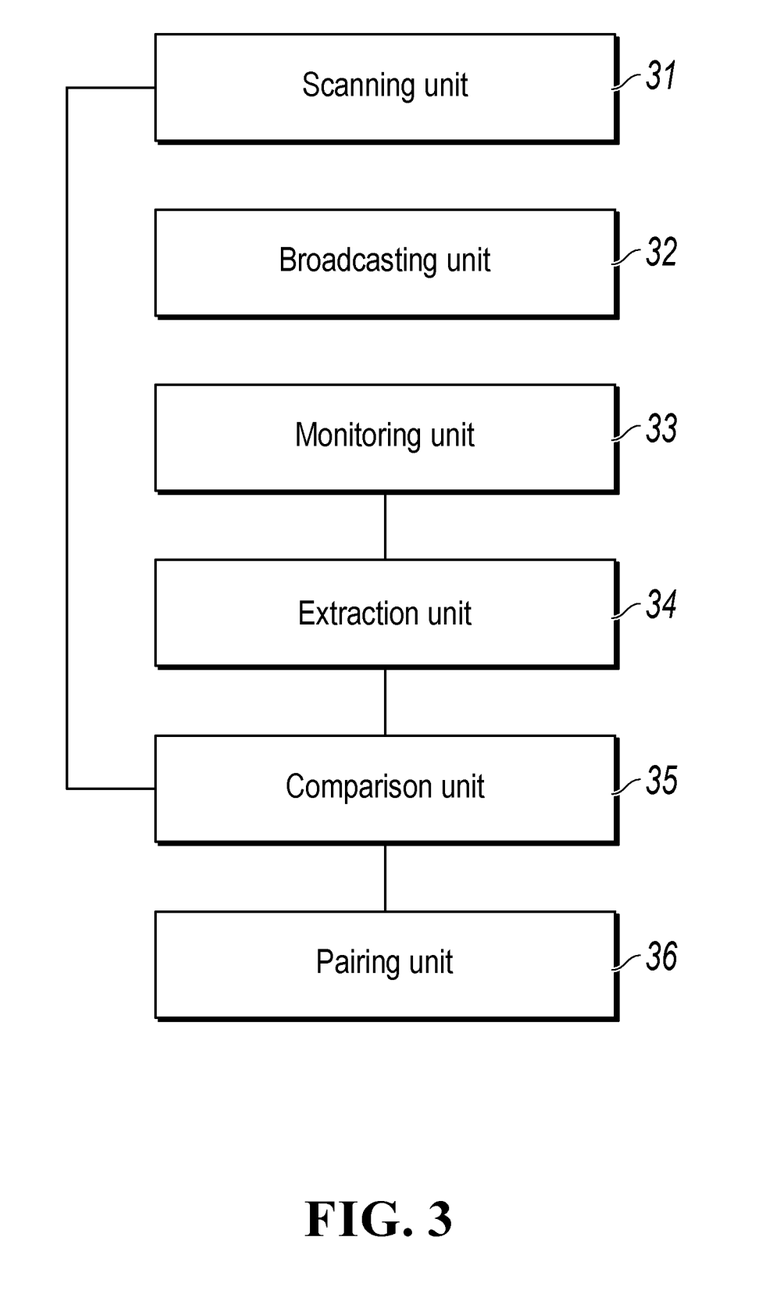
FIG. 3 is a module diagram illustrating an implementation of an intelligent terminal, according to the present application.

The present application further provides an implementation of an intelligent terminal. As shown in FIG. 3, the intelligent terminal includes: a scanning unit 31, configured to scan an identification code displayed by an intelligent wearable device; a broadcasting unit 32, configured to send a wireless broadcast signal; a monitoring unit 33, configured to monitor a response sent by the intelligent wearable device; an extraction unit 34, configured to extract the identification code from the received response after the monitoring unit receives the response; a comparison unit 35, configured to compare the extracted identification code with the scanned identification code; and a pairing unit 36, configured to pair up with the intelligent wearable device if a comparison result of the comparison unit is that the extracted identification code and the scanned identification code are consistent.

Preferably, the identification code includes a barcode and a two-dimensional code.

Figure 4:
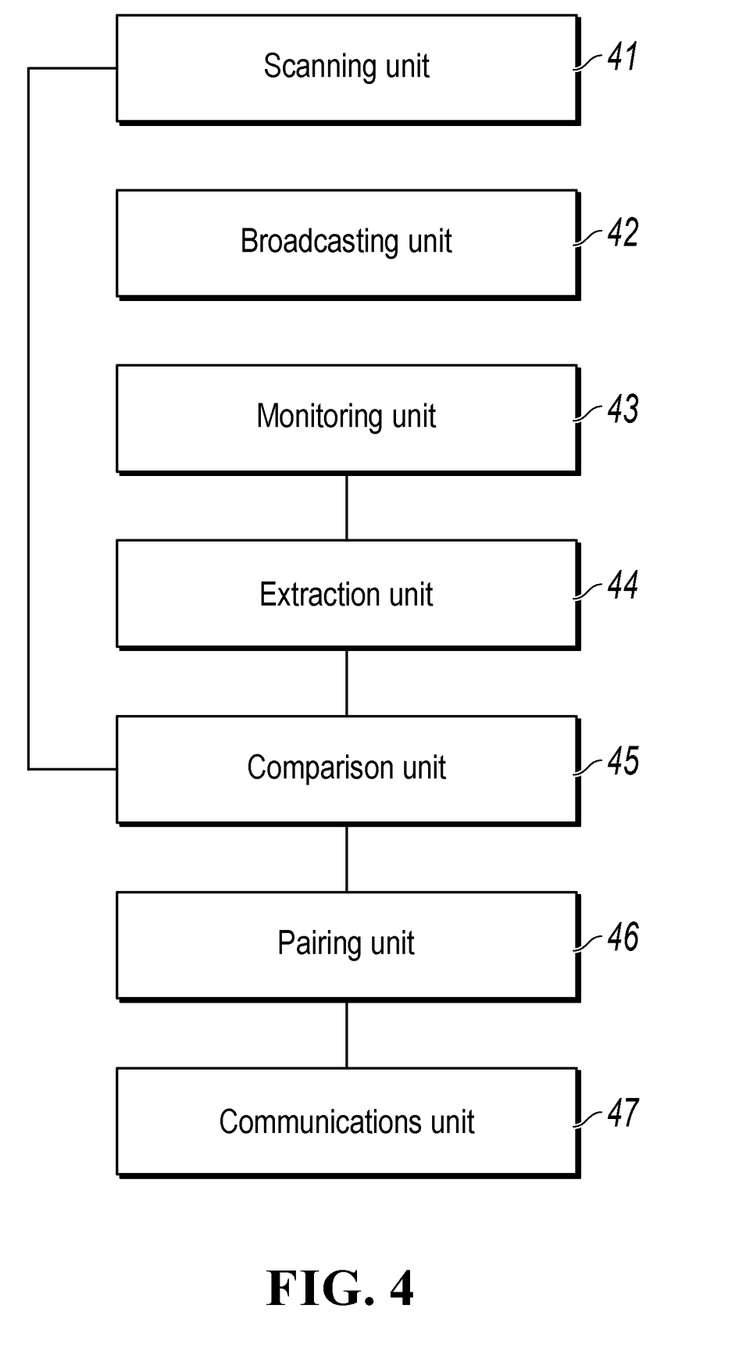
FIG. 4 is a module diagram illustrating an implementation of an intelligent terminal, according to the present application.

The present application further provides an implementation of an intelligent terminal. As shown in FIG. 4, the intelligent terminal includes: a scanning unit 41, configured to scan an identification code and a key index that are displayed by an intelligent wearable device; a broadcasting unit 42, configured to send a wireless broadcast signal; a monitoring unit 43, configured to monitor a response sent by the intelligent wearable device; an extraction unit 44, configured to extract the identification code from the received response after the monitoring unit receives the response; and a comparison unit 45, configured to compare the extracted identification code with the scanned identification code; a pairing unit 46, configured to pair up with the intelligent wearable device if a comparison result of the comparison unit is that the extracted identification code and the scanned identification code are consistent; and a communications unit 47, configured to perform encrypted communication with the intelligent wearable device by using a key corresponding to the key index.

Preferably, the identification code includes a barcode and a two-dimensional code.

Preferably, an encryption method includes at least one of a DES, an AES, an ECB, and PKCS5Padding.

In the 1990s, an improvement of a technology can be clearly distinguished between a hardware improvement (for example, an improvement of circuit structures, such as a diode, a transistor, and a switch) and a software improvement (an improvement of a method procedure). However, with development of the technology, nowadays improvement of a plurality of method procedures can be considered as a direct improvement of a hardware circuit structure. Almost all designers obtain a corresponding hardware circuit structure by programming an improved method procedure to a hardware circuit. Therefore, it cannot be said that an improvement of a method procedure cannot be implemented by using a hardware entity module. For example, a programmable logic device (PLD) (for example, a field programmable gate array (FPGA)) is such an integrated circuit. A logical function of the programmable logic device is determined by programming a device by a user. The designers independently perform programming to "integrate" a digital system into a single PLD without requiring a chip manufacturer to design and produce an application-specific integrated circuit chip. In addition, instead of manually producing an integrated circuit chip, the programming is mostly implemented by "logic compiler (logic compiler)" software, which is similar to a software compiler used during program development today. Original code that exists before compiling also needs to be written in a specific programming language, which is referred to as a hardware description language (HDL). There is more than one type of HDLs, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, RHDL (Ruby Hardware Description Language), etc. Currently, VHDL (Very-High-Speed Integrated Circuit Hardware Description Language) and Verilog are most commonly used. A person skilled in the art should also be understood that a hardware circuit that implements a logical method procedure can be easily obtained provided that the method procedure is locally programmed by using several previous hardware description languages.

A controller can be implemented in any proper method. For example, the controller can be a microprocessor or a processor, a computer readable medium that stores computer readable program code (for example, software or firmware) that is executed by the (micro) processor, a logic gate, a switch, an application-specific integrated circuit (Application-Specific Integrated Circuit, ASIC), a programmable logic controller, or an embedded microcontroller. Examples of the controller can include but are not limited to the following microcontrollers: ARC 625D, Atmel AT91SAM, Microchip PIC18F26K20, and Silicone Labs C8051F320. A controller of a memory can also be implemented as a part of controlling logic of the memory. A person skilled in the art also knows that the controller can be implemented in a method of pure computer readable program code, and the steps in the method can be logically programmed to enable the controller to further implement same functions in forms of a logical gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure inside the hardware component. Alternatively, an apparatus configured to implement various functions can also be considered as both a software module for implementing the method and a structure in a hardware component.

The system, apparatus, module, or unit illustrated in the previous implementations can be implemented by using a computer chip or an entity, or can be implemented by using a product having a certain function.

For ease of description, the described apparatus is described by dividing functions into various units. Certainly, when the present application is implemented, a function of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions can be stored in a computer readable memory that can instruct the computer or the other programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In typical configuration, a computing device includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a parallel random-access machine (PRAM), a static random access memory (SRAM), a dynamic random access memory (DRAM), another type of random access memory (RAM), a read-only memory (ROM), an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device, or any other non-transmission medium. The computer storage medium can be configured to store information that can be accessed by a computing device. Based on the definition in the present specification, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, and an optical memory) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in a distributed computing environment. In the distributed computing environments, tasks are performed by remote processing devices connected through a communications network. In the distributed computing environment, the program module can be located in both local and remote computer storage media including storage devices.

The implementations in the present application are described in a progressive way. For same or similar parts in the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall within the scope of the claims in the present application.

Figure 5:
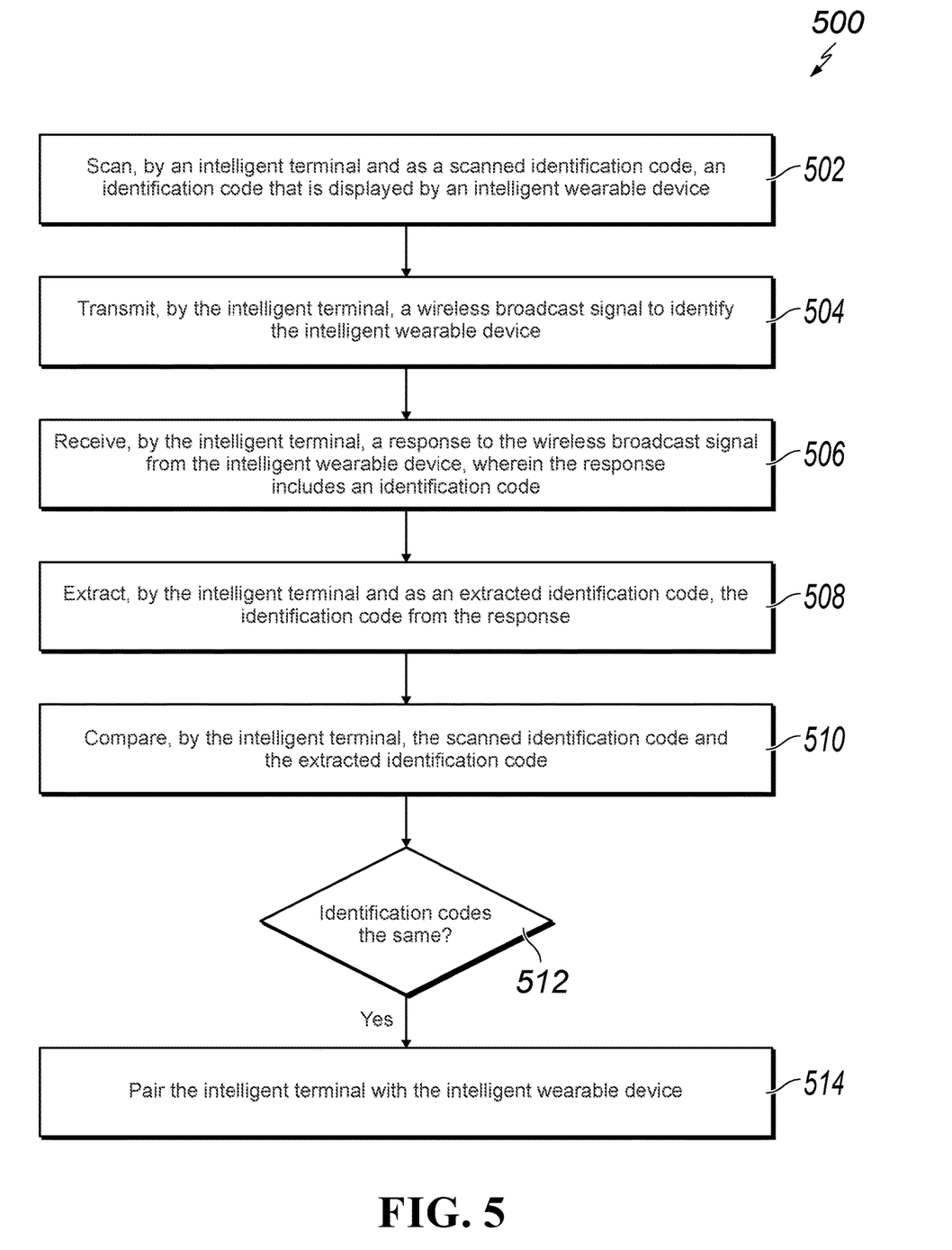
FIG. 5 is a flowchart illustrating an example of a computer-implemented method for paring an intelligent wearable device with an intelligent terminal, according to an implementation of the present disclosure.

FIG. 5 is a flowchart illustrating an example of a computer-implemented method 500 for paring an intelligent wearable device with an intelligent terminal, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, an intelligent terminal scans, as a scanned identification code, an identification code that is displayed by an intelligent wearable device. In some implementations, the identification code comprises a bar code and a two-dimensional code and the identification code is dynamically generated by the intelligent wearable device. In some implementations, the identification code is scanned by a software application that is installed on and executing on the intelligent terminal. In some implementations, at least one set of keys is pre-stored in the intelligent wearable device and in a software application installed on the intelligent terminal, and wherein each set of keys has a corresponding index. In some implementations, the intelligent terminal scans the identification code and a key index that are displayed by the intelligent wearable device. From 502, method 500 proceeds to 504.

At 504, a wireless broadcast signal is transmitted by the intelligent terminal to identify the intelligent wearable device. From 504, method 500 proceeds to 506.

At 506, a response to the wireless broadcast signal is received by the intelligent terminal and from the intelligent wearable device, where the response includes an identification code. In some implementations, the identification code included in the response is placed in a self-defined field of the response. From 506, method 500 proceeds to 508.

At 508, the identification code is extracted by the intelligent terminal from the response and as an extracted identification code. From 508, method 500 proceeds to 510.

At 510, the intelligent terminal compares the scanned identification code and the extracted identification code.

At 512, a determination is made as to whether the scanned identification code and the extracted identification code are the same. If it is determined that the scanned identification code and the extracted identification code are the same, method 500 proceeds to 514.

At 514, the intelligent terminal is paired with the intelligent wearable device. In some implementations, following the pairing of the intelligent terminal with the intelligent wearable device, the intelligent terminal performs, using a key corresponding to the key index, encrypted communications with the intelligent wearable device. After 514, method 500 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    scanning, by an intelligent terminal, a first identification code and a key index that are displayed by a display of an intelligent wearable device, wherein
        the first identification code comprises a bar code or a two-dimensional code, the first identification code is dynamically generated by the intelligent wearable device, at least one set of keys is pre-stored in the intelligent wearable device and in a software application installed on the intelligent terminal, and each set of keys has a corresponding index;

transmitting, by the intelligent terminal, a wireless broadcast signal to identify the intelligent wearable device;

receiving, by the intelligent terminal, a response message to the wireless broadcast signal from the intelligent wearable device;

extracting, by the intelligent terminal, a second identification code from a self-defined field of the response message, wherein a location and a length of the self-defined field are pre-determined through negotiation between the intelligent terminal and the intelligent wearable device, wherein the second identification code included in the response message is placed in the self-defined field of the response message;

comparing, by the intelligent terminal, the first identification code that was scanned by the intelligent terminal and the second identification code that was extracted from the response message to the wireless broadcast signal;

based on determining that the first identification code and the second identification code match, pairing the intelligent terminal with the intelligent wearable device;

retrieving, by the intelligent terminal, a key corresponding to the key index scanned by the intelligent terminal; and performing, by the intelligent terminal and using the key corresponding to the key index, encrypted communications with the intelligent wearable device.

2. The computer-implemented method of claim 1, wherein the first identification code is scanned by a software application that is installed on and executing on the intelligent terminal.

3. A non-transitory, computer-readable medium storing one or more instructions executable by a computer system to perform operations comprising:

scanning, by an intelligent terminal, a first identification code and a key index that are displayed by a display of an intelligent wearable device wherein the first identification code comprises a bar code or a two-dimensional code, the first identification code is dynamically generated by the intelligent wearable device, at least one set of keys is pre-stored in the intelligent wearable device and in a software application installed on the intelligent terminal, and each set of keys has a corresponding index;

transmitting, by the intelligent terminal, a wireless broadcast signal to identify the intelligent wearable device;

receiving, by the intelligent terminal, a response message to the wireless broadcast signal from the intelligent wearable device;

extracting, by the intelligent terminal, a second identification code from a self-defined field of the response message, wherein a location and a length of the self-defined field are pre-determined through negotiation between the intelligent terminal and the intelligent wearable device, wherein the second identification code included in the response message is placed in the self-defined field of the response message;

comparing, by the intelligent terminal, the first identification code that was scanned by the intelligent terminal and the second identification code that was extracted from the response message to the wireless broadcast signal;

based on determining that the first identification code and the second identification code match, pairing the intelligent terminal with the intelligent wearable device;

retrieving, by the intelligent terminal, a key corresponding to the key index scanned by the intelligent terminal; and performing, by the intelligent terminal and using the key corresponding to the key index, encrypted communications with the intelligent wearable device.

4. The non-transitory, computer-readable medium of claim 3, wherein the first identification code is scanned by a software application that is installed on and executing on the intelligent terminal.

5. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

scanning, by an intelligent terminal, a first identification code and a key index that are displayed by a display of an intelligent wearable device, wherein the first identification code comprises a bar code or a two-dimensional code, the first identification code is dynamically generated by the intelligent wearable device, at least one set of keys is pre-stored in the intelligent wearable device and in a software application installed on the intelligent terminal, and each set of keys has a corresponding index;

transmitting, by the intelligent terminal, a wireless broadcast signal to identify the intelligent wearable device;

receiving, by the intelligent terminal, a response message to the wireless broadcast signal from the intelligent wearable device;

extracting, by the intelligent terminal, a second identification code from a self-defined field of the response message, wherein a location and a length of the self-defined field are pre-determined through negotiation between the intelligent terminal and the intelligent wearable device, wherein the second identification code included in the response message is placed in the self-defined field of the response message;

comparing, by the intelligent terminal, the first identification code that was scanned by the intelligent terminal and the second identification code that was extra cted from the response message to the wireless broadcast signal;

based on determining that the first identification code and the second identification code match, pairing the intelligent terminal with the intelligent wearable device;

retrieving, by the intelligent terminal, a key corresponding to the key index scanned by the intelligent terminal; and performing, by the intelligent terminal and using the key corresponding to the key index, encrypted communications with the intelligent wearable device.

6. The computer-implemented system of claim 5, wherein the first identification code is scanned by a software application that is installed on and executing on the intelligent terminal.

* * * * *

UNITED STATES PATENT AND TRADEMARK OFFICE
CERTIFICATE OF CORRECTION

PATENT NO. : 10,798,568 B2
APPLICATION NO. : 16/192329
DATED : October 6, 2020
INVENTOR(S) : Xiaochen Wang et al.

Page 1 of 1

It is certified that error appears in the above-identified patent and that said Letters Patent is hereby corrected as shown below:

In the Claims

Column 15, Line 44, in Claim 3, delete "device" and insert -- device, --, therefor.

Column 16, Line 56, in Claim 5, delete "extra cted" and insert -- extracted --, therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*